US009555357B2

(12) United States Patent
Lehman

(10) Patent No.: US 9,555,357 B2
(45) Date of Patent: Jan. 31, 2017

(54) FILTER CHAMBERS AND SELF-CLEANING APPARATUS FOR VACUUM SYSTEMS

(71) Applicant: Air Dynamics Industrial Systems Corporation, York, PA (US)

(72) Inventor: Daniel P. Lehman, York, PA (US)

(73) Assignee: Air Dynamics Industrial Systems Corporation, York, PA (US)

( * ) Notice: Subject to any disclaimer, the term of this patent is extended or adjusted under 35 U.S.C. 154(b) by 163 days.

(21) Appl. No.: 14/543,684

(22) Filed: Nov. 17, 2014

(65) Prior Publication Data

US 2015/0151235 A1 Jun. 4, 2015

Related U.S. Application Data

(63) Continuation-in-part of application No. 13/273,922, filed on Oct. 14, 2011, now Pat. No. 8,888,880.

(60) Provisional application No. 61/393,013, filed on Oct. 14, 2010.

(51) Int. Cl.
*B01D 46/04* (2006.01)
*B01D 46/00* (2006.01)
*B01D 46/02* (2006.01)

(52) U.S. Cl.
CPC ............ *B01D 46/04* (2013.01); *B01D 46/002* (2013.01); *B01D 46/0021* (2013.01); *B01D 46/0075* (2013.01); *B01D 46/023* (2013.01); *B01D 2273/30* (2013.01)

(58) Field of Classification Search
CPC . B01D 46/04; B01D 46/0075; B01D 46/0021; B01D 46/023; B01D 46/002; B01D 2273/30
See application file for complete search history.

(56) References Cited

U.S. PATENT DOCUMENTS

| | | | | | |
|---|---|---|---|---|---|
| 1,118,044 | A | * | 11/1914 | Playter | B01D 46/0075 55/300 |
| 1,548,484 | A | * | 8/1925 | Prouty | B01D 46/002 55/287 |
| 1,574,422 | A | * | 2/1926 | Feind | B01D 46/0032 55/360 |
| 1,843,639 | A | * | 2/1932 | Hansen | B01D 46/0067 210/388 |
| 2,137,254 | A | * | 11/1938 | Turnbull | B01D 46/0004 55/304 |
| 2,143,664 | A | * | 1/1939 | Snyder | B01D 46/0075 55/304 |

(Continued)

*Primary Examiner* — Amber R Orlando
*Assistant Examiner* — Britanny Precht
(74) *Attorney, Agent, or Firm* — PatentBest; Andrew McAleavey

(57) ABSTRACT

Industrial vacuum systems are disclosed, as are filter chambers for industrial vacuum systems and other filtration applications. The filter chambers in these systems use two distinct types of filtering elements within a single chamber, arranging the filter elements such that air cannot pass through a secondary filter element until the air has first passed through and been filtered by a number of primary filter elements. The airflow within the filter chamber may be essentially vertical, and the secondary filter element may be positioned above the primary filter elements. The filter chamber may also include an agitation system for cleaning the filtering elements. The agitation system may be constructed such that it can operate while the system is in use.

4 Claims, 9 Drawing Sheets

(56) References Cited

U.S. PATENT DOCUMENTS

| | | | |
|---|---|---|---|
| 2,156,857 A | | 5/1939 | Kroenlein |
| 2,167,236 A | * | 7/1939 | Gieseler ............ B01D 46/0075 210/304 |
| 2,792,074 A | * | 5/1957 | Schilb ................ B01D 46/0075 55/341.1 |
| 3,808,776 A | * | 5/1974 | Jesernig ............ B01D 46/2411 55/300 |
| 3,877,901 A | * | 4/1975 | Snyder ............... B01D 46/0005 55/304 |
| 4,036,614 A | | 7/1977 | DeMarco |
| 4,217,117 A | * | 8/1980 | Syverson ........... B01D 46/0005 248/327 |
| 4,340,401 A | * | 7/1982 | van Weelden ..... B01D 46/0075 55/291 |
| 4,385,032 A | | 5/1983 | Fratzer et al. |
| 4,481,022 A | * | 11/1984 | Reier .................... B01D 46/06 29/446 |
| 4,488,883 A | | 12/1984 | Philp |
| 4,718,924 A | | 1/1988 | DeMarco |
| 4,726,825 A | | 2/1988 | Natale |
| 4,786,299 A | | 11/1988 | DeMarco |
| 5,259,854 A | | 11/1993 | Newman |
| 5,288,469 A | | 2/1994 | Skalla |
| 5,603,740 A | | 2/1997 | Roy |
| 6,245,120 B1 | | 6/2001 | Stanek |
| 6,379,434 B1 | | 4/2002 | Petrole |
| 6,569,217 B1 | | 5/2003 | DeMarco |
| 6,773,479 B2 | | 8/2004 | Debenedetti et al. |
| 6,786,946 B2 | | 9/2004 | Jung |
| 6,936,085 B2 | | 8/2005 | DeMarco |
| 6,949,130 B1 | * | 9/2005 | Grey .................... A47L 9/1666 55/305 |
| 7,222,392 B2 | | 5/2007 | McCormick et al. |
| 7,270,690 B1 | | 9/2007 | Sindel |
| 7,354,469 B2 | | 4/2008 | Volkmann |
| 7,473,288 B2 | | 1/2009 | Toyoda et al. |
| 7,695,537 B2 | | 4/2010 | Cheng |
| 8,001,652 B2 | | 8/2011 | Bair et al. |
| 8,337,575 B2 | | 12/2012 | Sabourin |
| 2002/0112459 A1 | | 8/2002 | Andress et al. |
| 2002/0152732 A1 | | 10/2002 | Kallsen et al. |
| 2003/0057145 A1 | | 3/2003 | Jensen |
| 2003/0131571 A1 | | 7/2003 | Demarco |
| 2005/0274094 A1 | | 12/2005 | Demarco |
| 2007/0226950 A1 | | 10/2007 | Demarco |
| 2007/0234906 A1 | | 10/2007 | Demarco |
| 2007/0251198 A1 | | 11/2007 | Witter |

* cited by examiner

FILTER CHAMBERS AND SELF-CLEANING APPARATUS FOR VACUUM SYSTEMS

CROSS-REFERENCE TO RELATED APPLICATIONS

This application is a continuation-in-part of U.S. application Ser. No. 13/273,922, filed Oct. 14, 2011, which claims priority to U.S. Provisional Patent Application No. 61/393,013, filed Oct. 14, 2010. The contents of both of those applications are incorporated by reference in their entireties.

BACKGROUND OF THE INVENTION

1. Field of the Invention

The invention relates generally to the field of air handling and vacuum systems, and more particularly to vacuum loading and material handling systems.

2. Description of Related Art

Vacuum loaders are industrial vacuum systems that use suction to collect material in large hoppers. The hoppers can be removed from the systems to process or dispose of the collected material.

In a typical vacuum loader, a fan or blower creates suction to draw air with entrained material into an inlet. The inlet typically opens over the hopper, and the entrained material is allowed to fall into the hopper. The air stream is then directed into a filter chamber, where filters remove any remaining entrained material while allowing the air to pass. Typically, filtered air exits out of the top of the filter chamber and passes through a separate housing containing a safety filter, the purpose of which is to protect the downstream fan or blower from damage. After passing through the safety filter, the filtered air is drawn through the fan or blower and exhausted to atmosphere.

Conventional piping and tubing are used to construct the typical airflow pathway in a vacuum loader. That piping can increase the overall cost of the system, and can also create difficulties in routing and arranging the piping.

General-purpose industrial vacuum systems typically have much the same configuration as vacuum loader systems, and may be adapted to handle larger or smaller matter. Most systems of this type have a filter chamber and a separate enclosure that houses a secondary filter element intended to protect the fan or blower.

SUMMARY OF THE INVENTION

One aspect of the invention relates to filter chambers for industrial vacuum systems. These filter chambers include two different types of filter elements in the same filter chamber. In filter chambers according to this aspect of the invention, air is drawn into an air inlet, which is coupled with the filter chamber. The air is directed to flow through a plurality of primary filter elements before flowing through a secondary filter element. The plurality of primary filter elements are arranged around the filter chamber such that essentially only air that passes through the primary filter elements reaches the secondary filter element. In one embodiment, the airflow within the filter chamber may be from bottom to top, and the secondary filter element or elements may be positioned above the plurality of primary filter elements.

Another aspect of the invention relates to an industrial vacuum system having a filter chamber like that described above. The industrial vacuum system includes a pump or blower that draws air through the system. The co-location of the two distinct types of filter elements in the filter chamber avoids the need for a second enclosure containing a separate safety filter to protect the pump or blower.

Yet another aspect of the invention relates to an agitation system for a filter chamber. The system comprises an agitator plate, a support bracket, and a plunger. The agitator plate includes a plurality of hooks adapted to connect to and suspend a plurality of primary filter elements within the filter chamber. A rod is fixedly connected to and extends outwardly from the agitator plate, and a pin, spaced from the rod, is connected to and extends perpendicularly from the agitator plate. The support bracket is connected to an interior sidewall of the filter chamber and extends inwardly from it. The support bracket has a slot that receives the pin and secures it. The plunger is on the exterior of the filter chamber and receives the rod through an opening in the filter chamber. With this arrangement, the agitator plate moves in response to actuation of the plunger, and is constrained to reciprocate in a single plate by the support bracket. In some embodiments, the plunger may be maintained at the same pressure as the filter chamber and may be resiliently biased, allowing the agitation system to operate when the vacuum system is in operation.

These and other aspects, features, and advantages of the invention will be set forth in the description that follows.

BRIEF DESCRIPTION OF THE DRAWING FIGURES

The invention will be described with respect to the following drawing figures, in which like numerals represent like elements throughout the figures, and in which.

DETAILED DESCRIPTION

Figure 1:
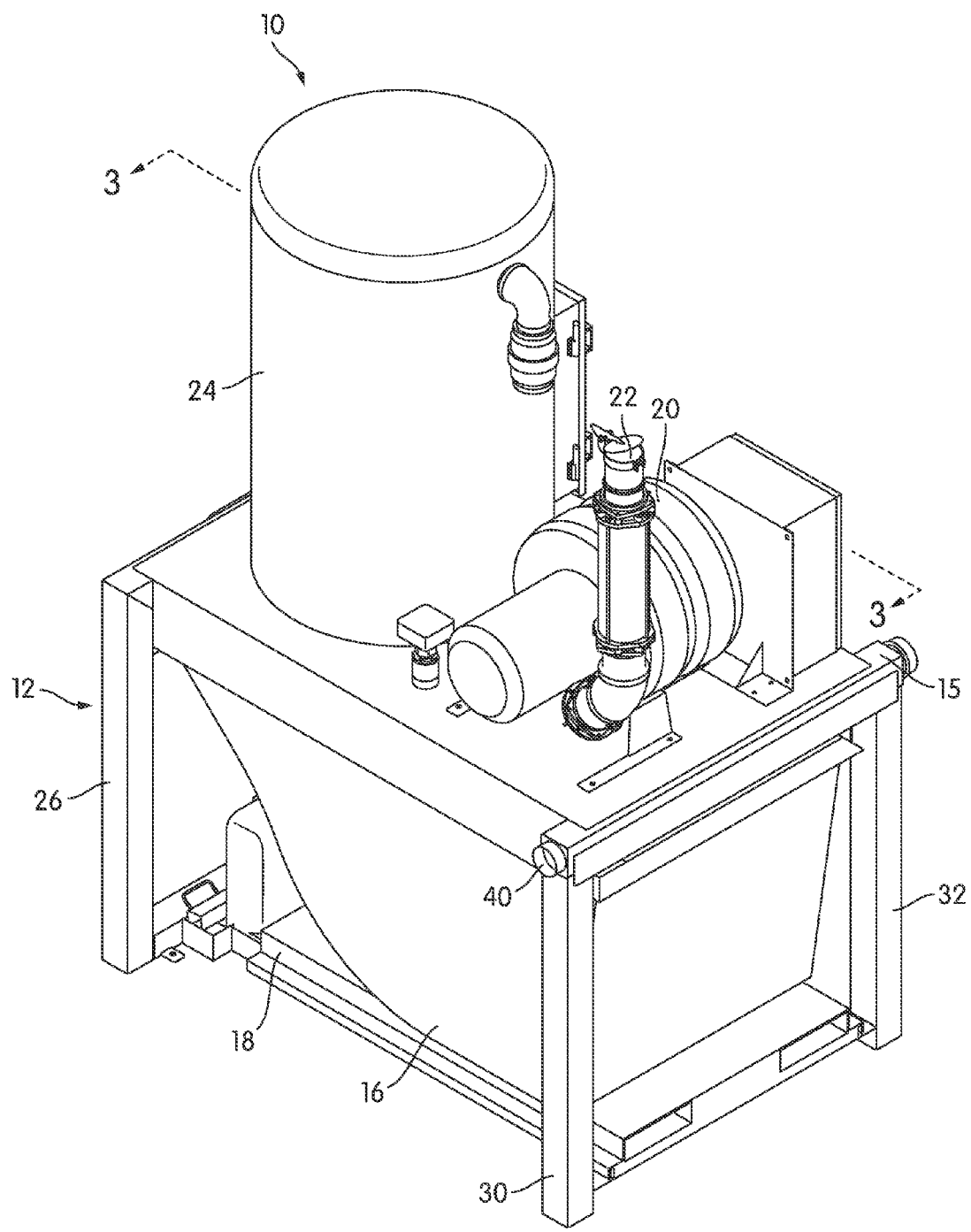
FIG. 1 is a perspective view of a vacuum loader system according to one embodiment of the invention.

FIG. 1 is a perspective view of a vacuum loader system, generally indicated at 10, according to one embodiment of the invention. The vacuum loader system 10 includes a frame or support structure 12, which is shown in the perspective view of FIG. 2. The support structure 12 rests on the floor or another surface, supports the system 10, and, as will be described below in more detail, includes an inlet 14. A hopper 16 is positioned under the support structure 12 to catch material entrained in the inlet air, and is carried by a pallet jack 18 in the illustrated embodiment for easy removal and handling. Above the support structure 12, a fan or blower assembly 20 draws air into the inlet 14, through the system 10, and out a silenced exhaust 22. A filter chamber 24 contains a plurality of filter elements that filter the air after most of the entrained material has been deposited in the hopper 16.

Figure 2:
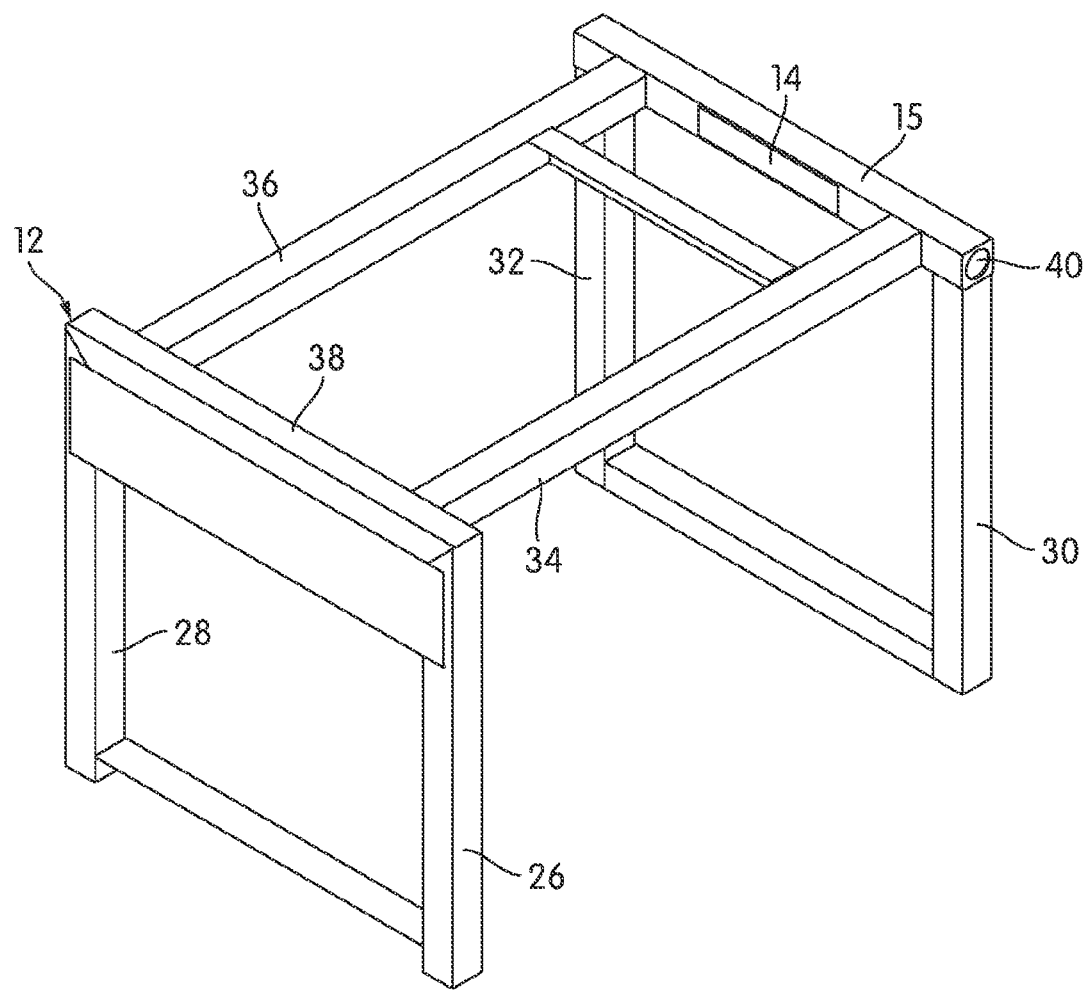
FIG. 2 is a perspective view of the support frame of the vacuum loader system of FIG. 1.

As shown in FIG. 2, the support structure 12 of the illustrated embodiment is comprised of a number of sections of square or rectangular tubing that define four legs 26, 28, 30, 32. The legs 26, 28, 30, 32 support a cross-braced four-member top frame, also comprised of sections of rectangular tubing, including two longer sides 34, 36, and two shorter sides 15, 38. The inlet member 15, which contains the inlet 14, is a part of the top frame, and thus serves a dual function as both an air inlet and a structural support member. The support structure 12 may be defined, for example, by 4 inch rectangular tubing. However, as those of skill in the art will realize, the manner in which the support structure 12 contacts the ground or floor level to support the system 10 is not critical to the invention, so long as it provides the requisite amount of support. More or fewer legs may be used, and in some embodiments, alternative structures, like cross-braced, interconnected frames, may be used. In some embodiments, the lower portion of the support structure 12 may be fully enclosed by panels or other such structures.

The inlet member 15 has a round coupling 40 that allows it to connect to a standard hose. Once air enters the coupling 40, the inlet member 15 broadens into a square interior cross-section. The inlet 14 of the illustrated embodiment comprises a wide rectangular slot on the inner side of the inlet member 15 that allows the air and entrained material to move out of the inlet member 15 and pass over the hopper 16, where the entrained material is deposited by gravity. The coupling 40 may be, for example, a 4-inch round coupling, with the inlet member 15 being comprised of 4-inch square tubing.

The support structure 12 is generally designed symmetrically, such that either of the short top frame members 15, 38 could serve as an inlet member and, more broadly, such that any of the top frame members 15, 34, 36, 38 could be configured as an inlet member in some embodiments. In some embodiments, the inlet member 15 may be the only member of the support structure 12 that is open to air passage; the other top frame members 34, 36, 38 may be sealed off. However, in other embodiments, all of the top frame members 34, 36, 38 may be open to air passage. Opening all of the top frame members 15, 34, 36, 38 to air passage facilitates the interchangeable selection of any one of the members 15, 34, 36, 38 as the inlet, and it may have other beneficial effects as well.

More specifically, if all of the top frame members 15, 34, 36, 38 are open to the passage of air, then incoming air may flow around the top frame of the support structure 12 and impinge on itself, which may serve two beneficial purposes. First, the impinging air flowing around the inlet may help to deposit a fine layer of particulate material on the insides of the top frame members 15, 34, 36, 38, which protects the interior of the members 15, 34, 36, 38 from wear. Second, the impinging air flows tend to slow the incoming air, which may help in depositing the greatest possible quantity of material into the hopper 16. The change in cross-section of the inlet member 15 from round to rectangular and the commensurate increase in cross-sectional area also tends to slow the incoming air somewhat.

Figure 3:
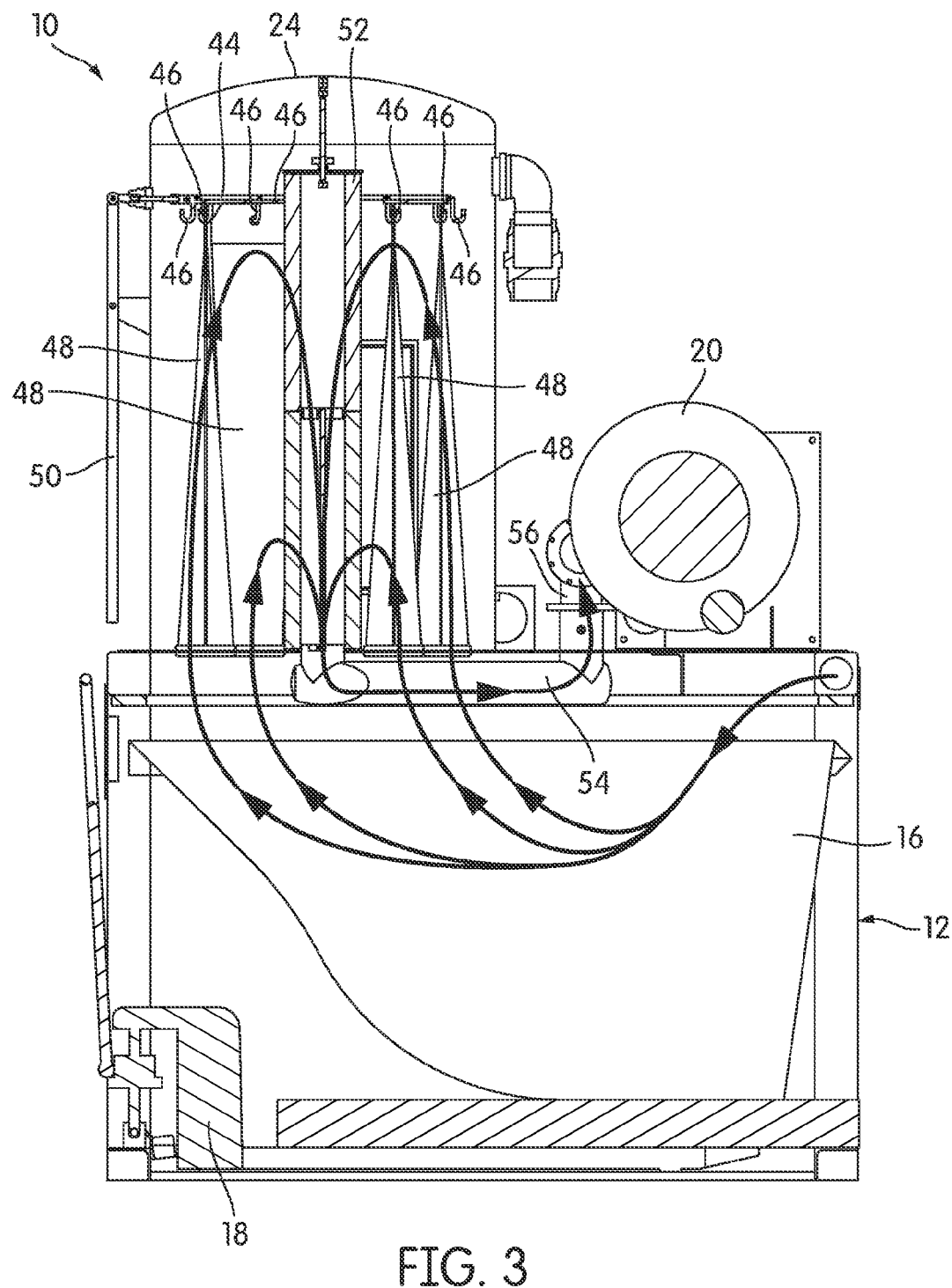
FIG. 3 is a sectional view of the vacuum loader system of FIG. 1, illustrating air flow paths within the system.

FIG. 3 is a sectional view of the vacuum loader system 10, taken through Line 3-3 of FIG. 1. As shown in FIG. 3, once the air passes over the hopper 16, it is directed upward, into the filter chamber 24. The filter chamber 24 is a generally cylindrical chamber with a slightly domed top, and it is generally made of a metal, such as steel. As those of skill in the art will understand, the shape of the filter chamber 24 is not critical, and the filter chamber 24 may be of any convenient shape. A rack 44 is suspended within the filter chamber 24; depending on the embodiment, it may hang from a chain or cord attached to the top of the filter chamber 24 or it may be attached to and cantilevered from the sidewall of the filter chamber 24. The rack 44 has a plurality of hooks 46 that are constructed and arranged to receive and support a corresponding plurality of primary filter elements 48 (not shown in FIG. 5). The rack 44 is also attached to a shaker or agitator mechanism in the form of a lever 50 and associated structures that are connected to the rack 44 and can be actuated to shake the rack 44. Shaking the rack 44 can help to remove material that has been deposited on the primary filter elements 48.

The primary filter elements 48 of the illustrated embodiment are semi-conical bags. They may be made of any typical filter material. For example, the primary filter elements 48 may be made of a polyester felt with a weight of about 16 ounces per square yard. Generally, the rack 44 and its hooks 46 are arranged such that there are enough primary filter elements 48 to cover approximately the entire inner circumference of the filter chamber 24 and fill substantially the entirety of the space within the filter chamber 24.

As was described briefly above, a standard filter chamber for an industrial vacuum system might contain only filter elements similar to the primary filter elements 48. However, in the system 10, the primary filter elements 48 are co-located in the filter chamber 24 with secondary or safety filter element or elements 52. The secondary filter element 52 or elements of the illustrated embodiment are suspended from the top of the filter chamber 24 and are positioned at the center of the filter chamber 24, such that they are at least substantially entirely surrounded by primary filter elements 48. The positioning of the secondary filter elements 52 is primarily intended to ensure that air reaching the secondary filter elements 52 has already been filtered by the primary filter elements 48.

In the illustrated embodiment, there are two secondary filter elements 52 placed such that their long ends abut one another. The primary purpose of the secondary filter elements 52 is to provide an element of safety and ensure that air cannot reach the fan or blower 20 unless it has been filtered, so as to ensure that the fan or blower 20 is not damaged by any material that might otherwise be entrained in the air. The secondary filter elements 52 may be any type of filter elements used in the art for this purpose, and in the illustrated embodiment are standard cartridge filter elements. In some embodiments, the nature of the secondary filter elements 52, their number, and characteristics may be dictated by the manufacturer of the fan or blower 20, or by the nature of the filtration that should be achieved in order to protect the fan or blower 20. The co-located primary and secondary filter elements 48, 52 eliminate the necessity of building a separate housing for the secondary filter elements 52.

The filter chamber 24 may include a surge valve positioned such that if the primary filter elements 48 become blocked, the surge valve will open to allow incoming air to bypass the primary filter elements 48 and flow directly to the secondary filter elements 52. This bypass flow continues to cool the fan 20 so as to avoid overheat and mechanical breakdown. As was described above, in some cases, the primary filter elements 48 may be unblocked by using the agitator lever 50; in other cases, the filter chamber 24 may need to be opened and the primary filter elements 48 replaced.

As shown in FIG. 3, once filtered air passes through the secondary filter elements 52, it transits a short section of pipe 54 that lies under the filter chamber 24 and the fan 20 and within the support assembly 12. An elbow 56 connects the pipe 54 with the fan 20.

Figure 4:
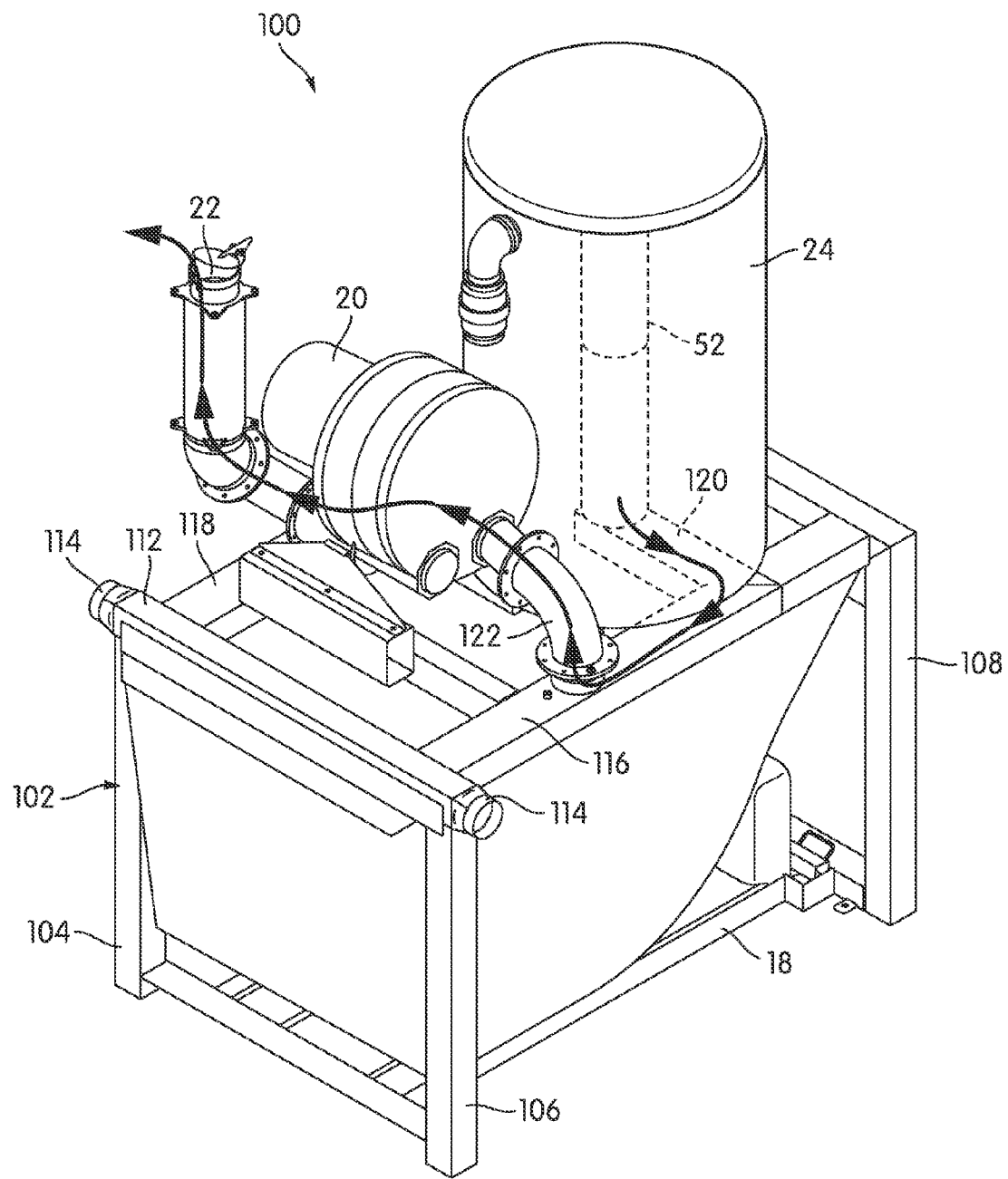
FIG. 4 is a perspective view of a vacuum loader system according to another embodiment of the invention.

FIG. 4 is a perspective view of another embodiment of a vacuum loader system, generally indicated at 100. The vacuum loader system 100 is generally similar to the vacuum loader system 10 of the previous embodiment; therefore, those elements not described with respect to the vacuum loader system 100 may be assumed to be similar to the corresponding elements of the vacuum loader system 10.

The vacuum loader system 100 has a support structure 102. Like the support structure 12, the support structure 102 has a plurality of legs 104, 106, 108, and may have or use additional supports as well. (In the view of FIG. 4, a fourth leg is not shown.) In the upper portion of the support structure 102, one of the shorter sides acts as an inlet member 112 and provides both structural support and a flow pathway for incoming air. Like the inlet member 14, the inlet member 112 has round couplings 114 at its ends to mate with a connecting hose or tube through which the air is to be drawn. Whichever coupling 114 is not being used may be plugged.

The primary difference in the vacuum loader system 100 is that the support structure 102 provides both inlet and outlet members for air flow. Specifically, the long sides 116, 118 of the upper frame are broadened and flattened relative to their counterparts 34, 36 in the system 10. One of the long sides 116 is used to carry the air flow from the secondary filter elements 52 within the filter chamber 24 back to the fan or blower 20. Specifically, a short spur of rectangular tubing 120 serves to connect the outflow from the secondary filter elements 52 with the long side 116 that acts as the outlet/air return member. Beyond the point where the long side outlet member 116 joins the connecting spur 120, the long side 116 is sealed to air flow in a way that prevents incoming air flow that might otherwise be flowing around in a circuit from the inlet member 112 from mixing with the outgoing air flow. Thus, incoming "dirty" air is not permitted to mix with outgoing "clean" air. A short, round elbow of pipe 122 connects between the top face of the long side outlet member 116 and the fan or blower 20 to return the air to the fan or blower 20.

As with the use of a support member 14 as an inlet member, the use of a support member 116 as an outlet/air return member simplifies the construction of the system 100, eliminates the need for a separate flow pathway for the clean air that is returning to the fan or blower 20, and results in a commensurate cost savings in the construction of the system 100.

Vacuum loader systems 10, 100 according to embodiments of the invention may include metal or plastic sheeting or other materials atop the support structure 12, 102 to conceal the inlet and outlet members, prevent material in the hopper 16 below from blowing upward, and to perform other functions. If such sheeting is provided, the fan or blower 20, the flange of the connecting pipe 122, and other structures may be secured to it.

The support structures 12, 102 described above use tubing of square and rectangular cross-sections, but tubing of any shape or cross-section may be used, including round tubing. However, as was described above, it may be useful in at least some embodiments if the cross-sectional area of the tubing increases as the air enters the support structures 12, 102. Additionally, the inlets and outlets may use any form of coupling, piping, or connecting hose to connect with the hoses or other structures that may be used with the vacuum loader systems 10, 100.

While the above description focuses on vacuum loaders, as those of skill in the art will appreciate, some of the features described above are not limited to use in vacuum loader systems, and may also be used in more general industrial and other types of vacuum systems. In particular, other vacuum systems may include two different filter elements in the same chamber.

Figure 5:
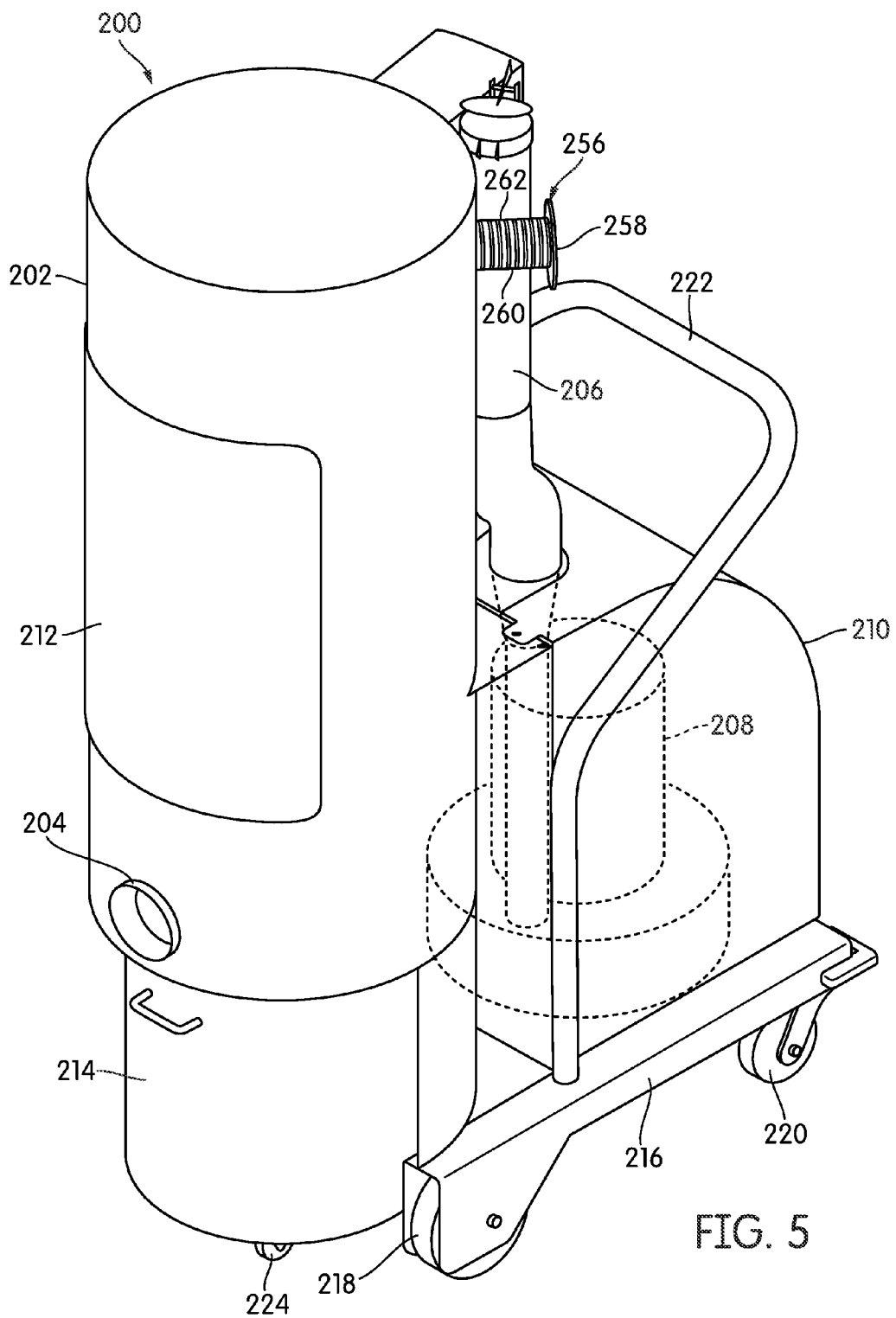
FIG. 5 is a perspective view of an industrial vacuum system according to another embodiment of the invention.

FIG. 5 is a perspective view of an industrial vacuum system, generally indicated at 200, according to another embodiment of the invention. The industrial vacuum system 200 includes a filter chamber 202. As with the other embodiments, the filter chamber 202 is generally cylindrical in shape, but may be of any convenient shape. An air inlet 204 directs incoming air into the filter chamber 202 and is adapted to be connected to a hose or another type of air-directing structure. An air outlet 206 directs filtered air from the filter chamber 202 toward an air mover, such as a pump or blower 208, which is contained within a housing 210. An access hatch 212 provides access to the filter chamber 202, for example, to replace filter elements. Beneath the filter chamber 202, a hopper drawer 214 collects dust and other elements entrained in the inlet air and is removable to dispose of that material. The industrial vacuum system 200 is adapted to be portable, and to that end, is equipped with a frame 216 that includes wheels or casters 218, 220 and a handle 222. The bottom of the filter chamber assembly may include additional wheels or casters 224.

Figure 6:
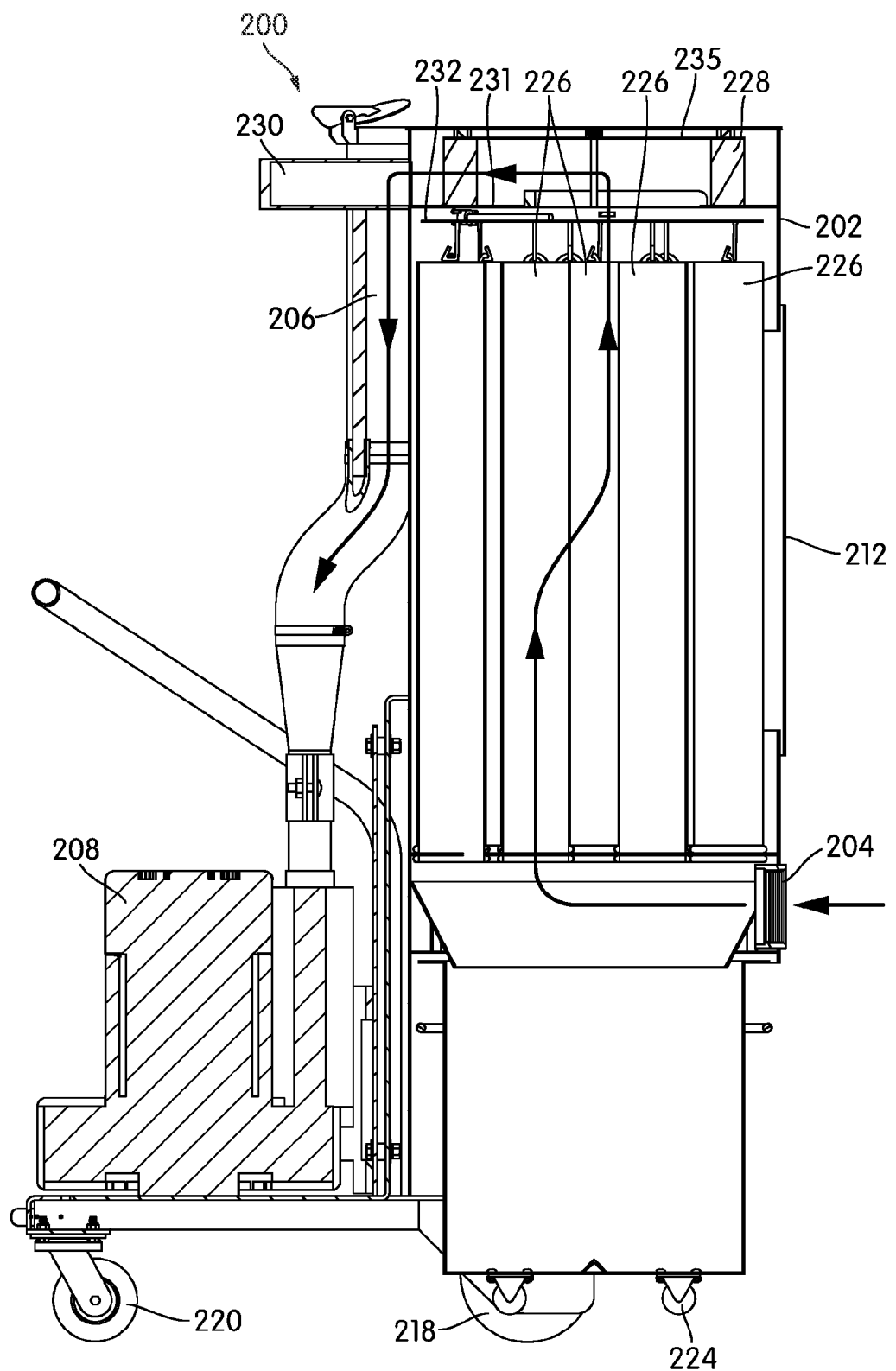
FIG. 6 is a cross-sectional view of the industrial vacuum system of FIG. 5.

FIG. 6 is a cross-sectional view of the vacuum system 200 of FIG. 5. As shown, the filter chamber 202 includes two distinct types of filter elements: a plurality of generally cylindrical primary bag filters 226, and a secondary filter 228. The secondary filter 228 may be any type of filter that has a relatively large surface area and a relatively low profile. In some embodiments, the secondary filter 228 may be an annular cartridge filter with pleated media (e.g., paper or cloth) to increase the surface area of the filter media. That would likely be the case for many commercial embodiments. However, other materials may be used for the secondary filter 228—for example, sintered plastic and sintered metal filters may be used in at least some embodiments. These types of materials may render a filter washable and re-useable. As those of skill in the art will realize, the precise nature of both the primary and secondary filters 226, 228 will depend on the nature of the filtration taking place.

Like the arrangement of the loader vacuum systems 10, 100 described above, the filter chamber 202 of the vacuum system 10, 100 is arranged such that incoming air cannot reach the secondary filter 228 until it has passed through the bag filters 226. However, the physical arrangement of the filter chamber 202 differs slightly from that of the previous embodiments in that while the secondary filter 228 is essentially surrounded by the bag filters 226, it is not physically in the center of those filters 226.

With the arrangement of FIG. 6, air flows in through the inlet 204 and is forced to make a turn, so that it flows upwardly into the filter chamber 202, where it is first filtered by the cylindrical bag filters 226, which fill essentially the entire lower volume of the filter chamber 202. After the air passes through the bag filters 226, it flows into the center of and through the annular secondary filter 228 before exiting the filter chamber 202 into the air outlet pipe 206 that directs the air to the pump or blower 208.

The secondary filter 228 itself sits on an annular shelf 231 that is welded or otherwise secured in fluid-tight fashion to the inner wall. The shelf 231 extends out far enough that the air is forced to enter the secondary filter 228 from its annular center and to flow from the inside of the secondary filter 228 through its thickness and toward the outside. The secondary filter 228 is thus essentially fitted within an upper compartment defined at the top by the top of the filter chamber 202 and at the bottom by the shelf 231. The secondary filter 228 itself has a top 235 that prevents the air from flowing out the top and forces it to flow through the perimeter of the secondary filter 228, from the inside toward the outside, during which process it is filtered.

Thus, the air is filtered sequentially by both elements 226, 228 before it leaves the filter chamber 202. Moreover, the filter chamber 202 is arranged such that the air cannot get to the secondary filter element 228 without first going through the primary filter elements 226. As with the vacuum loader 10, 100 embodiments described above, this arrangement eliminates the need for a second enclosure for a safety filter prior to the pump or blower 208. While FIG. 6 illustrates a single filter 228, more than one filter 228 may be used if necessary or desirable, typically by stacking them in a single column.

The filter chamber 202 also includes a secondary outlet (not shown in FIG. 6) and an exterior pressure relief valve or series of redundant valves coupled to the outlet 206. If the primary or secondary filters 226, 228 become jammed or otherwise unable to pass air, when the pressure inside the filter chamber reaches a defined pressure, a pressure relief valve (not shown in the figures) will open, allowing partially filtered air to bypass pass out of the filter chamber 202.

The primary bag filter elements 226 are intended for relatively long-term use. Because of the nature of these elements, they can be at least partially cleaned simply by agitating them, which typically causes collected dust and dirt to drop off. In some embodiments of the invention, this may be accomplished by opening the hatch 212 of the filter chamber 202 and manually shaking the bag filters 226.

However, the vacuum system 200 preferably includes some kind of agitator mechanism that allows the user to agitate the bag filter elements 226 in order to clean them without having to open the hatch 212 to manually agitate them. Thus, as can be seen in FIG. 6, an agitator plate 232 is provided. The bag filter elements 226 hang from hooks 234 that are connected to the agitator plate 232. The agitator plate 232 and the system of which it is a part will be described below in more detail.

Figure 7:
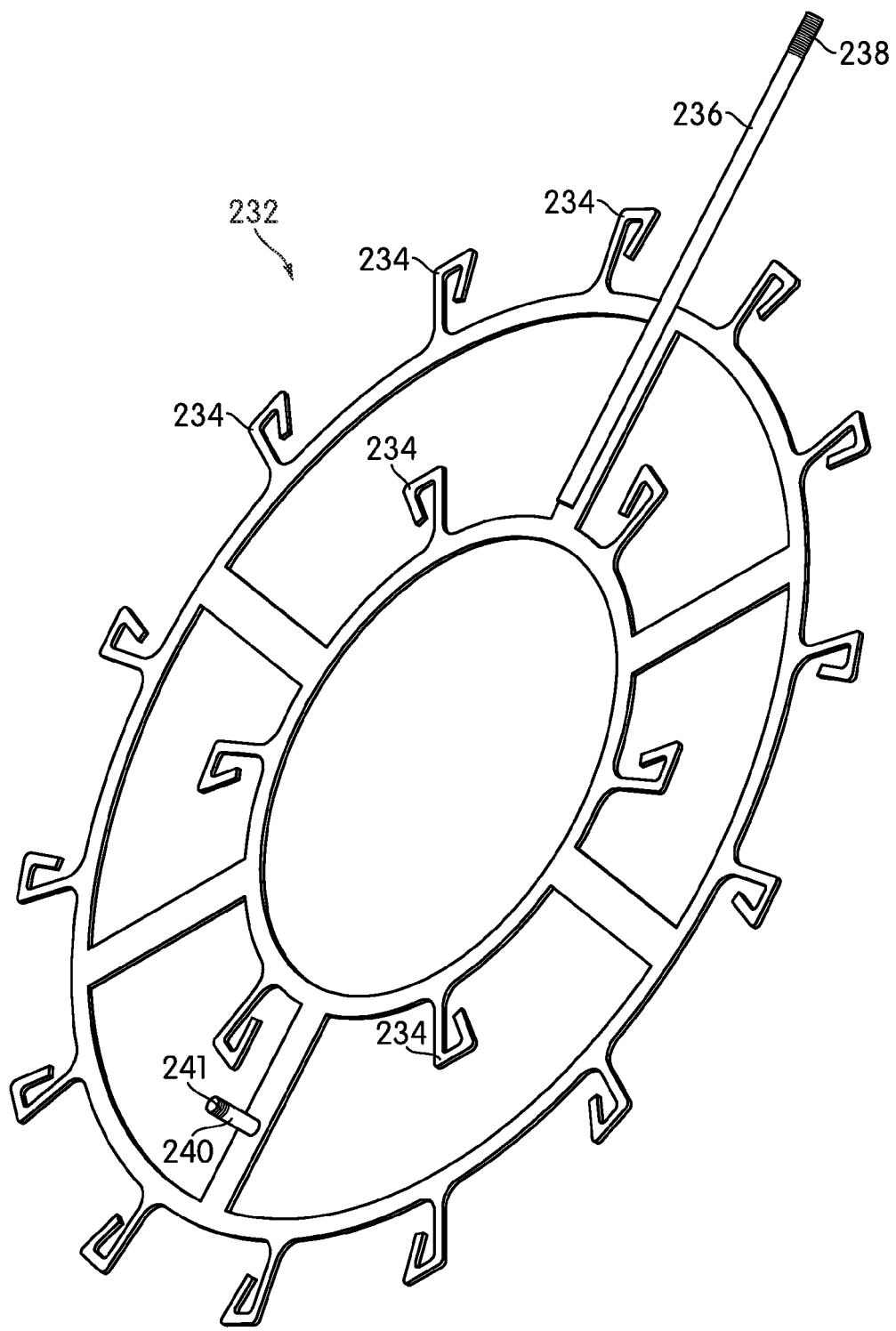
FIG. 7 is a perspective view of an agitator plate from which certain filter elements are suspended in the industrial vacuum system of FIG. 5.

FIG. 7 is a perspective view of the agitator plate 232 in isolation. In some embodiments, a conventional agitator plate with holes or rings for S-hooks or J-hooks may be used. However, the agitator plate 232 of the illustrated embodiment is made of a thin metal and includes a number of J-hooks 234; i.e., the hooks 234 are actually a part of the agitator plate 232. In the illustrated embodiment, the agitator plate provides two concentric rings of hooks 234, an inner ring of six hooks 234, and an outer ring of fourteen hooks 234. The pitch and number of the hooks 234 are determined by the size of the filter chamber 202 and the size of the primary filter elements 226; in other embodiments, the number and arrangement of the hooks 234 may be different.

The structure shown in FIG. 7 may be made in any number of ways, e.g., by casting, milling, or punching. In one particularly advantageous embodiment, however, the agitator plate 232 is laser-cut from sheet aluminum or steel. Once the agitator plate 232 is cut, the hooks 234 are bent out-of-plane into their useable position. In many embodiments, the hooks 234 will be bent down, but in some embodiments, the hooks 234 may be appropriately modified in shape and bent upwardly. Upwardly-extending hooks may result in a lower profile filter chamber 202, saving 2-3 inches at the top.

As shown in FIG. 7, the agitator plate 232 has two features that connect it with other structures. The first is a rod 236 that extends out from the agitator plate 232 parallel to it. As will be described below in more detail, the rod 236 couples the agitator plate 232 to a plunger 256 and includes a threaded end 238. Across and some distance away from the rod 236, a pin 240 extends normal to the agitator plate 232. The pin 240 has a threaded end 241.

Figure 8:
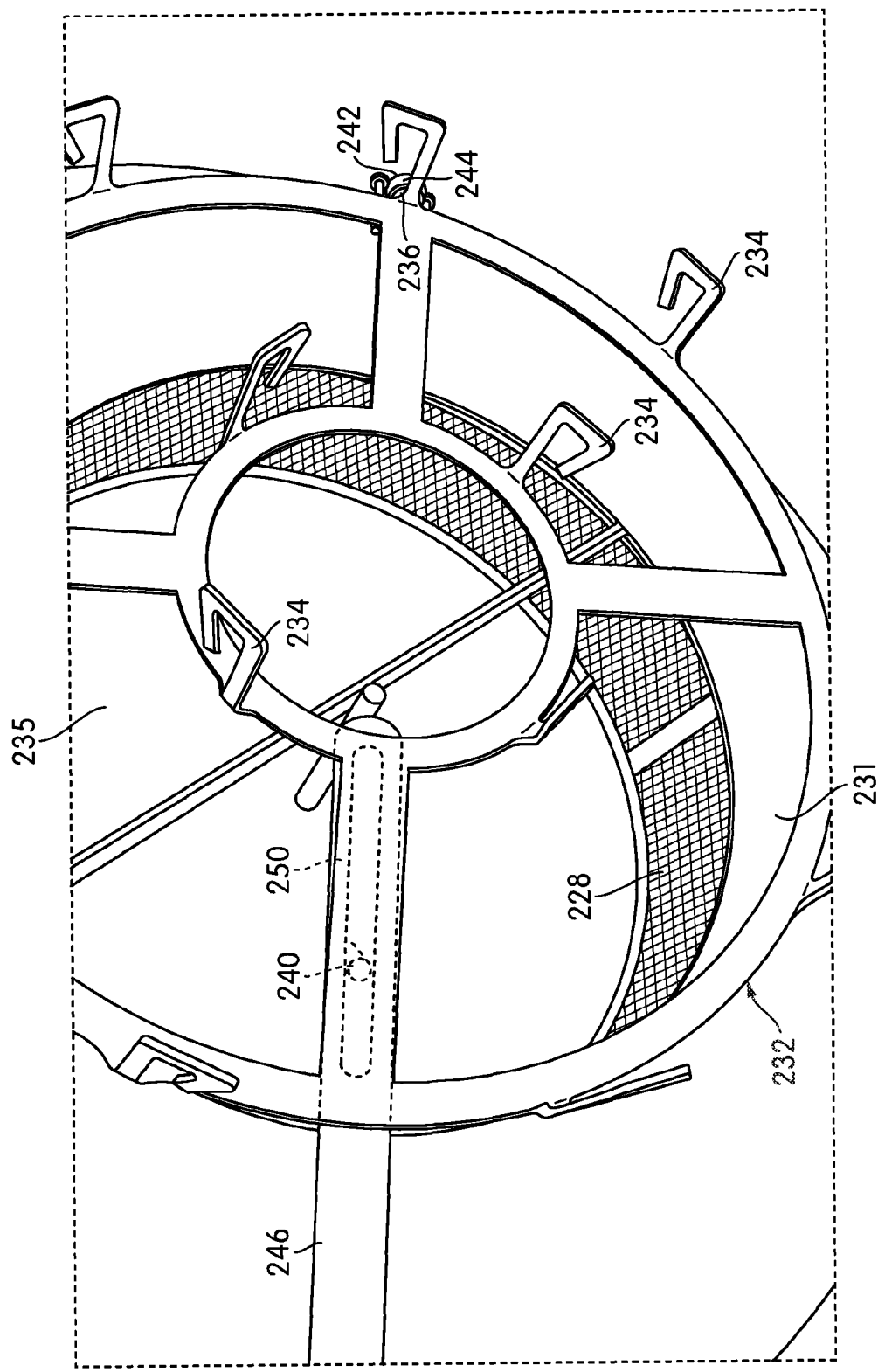
FIG. 8 is a perspective view of the upper portion of the filter chamber of the industrial vacuum system of FIG. 5.

FIG. 8 is a perspective view of the upper interior of the filter chamber 202, illustrating the agitator plate 232 as installed with its hooks 234 bent down. The rod 236 exits the filter chamber 202 through an opening 242 in which a plastic or rubber bushing 244 has been placed. Typically, an opening is cut in the outside wall of the filter chamber 202 and a cap that includes the opening 242 is welded into the opening in the outside wall. The rod 236 passing through the filter chamber 202 supports the agitator plate 232 on one side.

Figure 9:
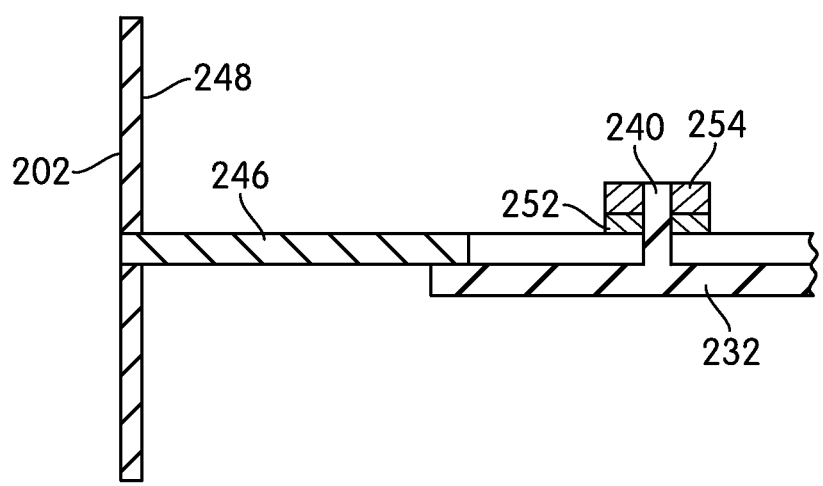
FIG. 9 is a schematic cross-sectional view of a portion of the filter chamber of the industrial vacuum system of FIG. 5.

On the other side, a bracket 246 is welded to the interior wall 248 of the filter chamber 202 and extends inwardly toward the center of the chamber 202. The bracket 246 and its connections are shown in FIG. 8 as well as the partial side elevational view of FIG. 9. The bracket has a slot 250 that extends along its middle. The slot 250 receives the pin 240. Once the pin 240 is in the slot 250, a washer 252 and a nut 254 are placed over its threaded end 241 to secure it to the bracket 246. Thus, the agitator plate 232 is secured in such a way that it can move side to side (guided by the slot 250), but is constrained by the connection with the bracket 246 so that it cannot move out of the horizontal plane in which it is installed.

On the exterior of the filter chamber 202, the actuator for the agitation system is a plunger, generally indicated at 256. The end cap 258 has a threaded connector on its inward-facing side, and the threaded end 238 of the rod 236 connects to it. The sidewalls 260 of the plunger 256 are made of a flexible material, reinforced with a vacuum-rated hose 262 wound in a spiral around the plunger 256. The hose 262 is reinforced with a resilient member. When the plunger 256 is depressed, the rigid connection between the plunger 256 and the rod 236 drives the rod 236 inward, which causes the agitator plate 232 to move, thus agitating the filter bags 226.

The plunger 256 is open to vacuum and is maintained at the same pressure as the interior of the filter chamber 202. The vacuum hose 262 extending from the interior of the filter chamber 202 ensures that the interior pressure is communicated to the plunger 256. The hose 262 with its resilient member keep the plunger 256 biased to extend outward to the end of its stroke. With the plunger 256 at the same pressure as the filter chamber 202, the agitation system can be actuated by depressing the plunger 256 even when the vacuum system 200 is operating. It can also be actuated when the vacuum system 200 is not operating.

As those of skill in the art will appreciate, the vacuum system 200 is a negative pressure system. However, the sense of the airflow may be reversed in some embodiments, typically by reversing the direction in which the air mover 208 moves the air. In general, filter chambers and filter agitation systems according to embodiments of the invention may be used for positive or negative pressure filtration, and the filter chambers and agitation systems described here may find broader applications.

Although the invention has been described with respect to certain embodiments, the embodiments are intended to be exemplary, rather than limiting. Modifications and changes may be made within the scope of the invention, which is defined by the appended claims.

What is claimed is:

1. An agitation system for a filter chamber, comprising:
an agitator plate including
a plurality of hooks adapted to connect to and suspend a plurality of primary filter elements within the filter chamber,
a rod fixedly connected to and extending outwardly from the agitator plate, and
a pin, spaced from the rod, connected to and extending perpendicularly from the agitator plate;
a support bracket connected to an interior sidewall of the filter chamber and extending inwardly therefrom, the support bracket having a slot that receives the pin and secures it; and
a plunger on the exterior of the filter chamber, the plunger receiving the rod through an opening in the filter chamber;
wherein the agitator plate moves in response to actuation of the plunger, and is constrained to reciprocate in a single plane by the support bracket.

2. The agitation system of claim 1, wherein the plunger is maintained at essentially the same pressure as the filter chamber.

3. The agitation system of claim 2, wherein the plunger further comprises a vacuum hose with a resilient member that biases the plunger toward an outward position.

4. The agitation system of claim 1, wherein the plurality of hooks are integrally formed with the agitator plate.

* * * * *